United States Patent
Yasuda et al.

(10) Patent No.: US 9,252,594 B2
(45) Date of Patent: Feb. 2, 2016

(54) LOAD DRIVING DEVICE

(71) Applicant: HONDA MOTOR CO., LTD., Tokyo (JP)

(72) Inventors: Masato Yasuda, Wako (JP); Naotaka Tsuji, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 413 days.

(21) Appl. No.: 13/691,846

(22) Filed: Dec. 3, 2012

(65) Prior Publication Data

US 2013/0169048 A1 Jul. 4, 2013

(30) Foreign Application Priority Data

Dec. 28, 2011 (JP) ................................. 2011-287804

(51) Int. Cl.
| | |
|---|---|
| *H02J 3/14* | (2006.01) |
| *H02J 1/00* | (2006.01) |
| *H02M 1/12* | (2006.01) |
| *B60L 15/00* | (2006.01) |
| *H02J 1/02* | (2006.01) |

(Continued)

(52) U.S. Cl.
CPC .................. *H02J 1/00* (2013.01); *B60L 15/007* (2013.01); *H02M 1/126* (2013.01); *B60L 2270/147* (2013.01); *H02J 1/02* (2013.01); *H02J 3/01* (2013.01); *H02J 3/14* (2013.01); *H02J 4/00* (2013.01); *H02M 2001/123* (2013.01); *Y10T 307/406* (2015.04); *Y10T 307/74* (2015.04)

(58) Field of Classification Search
CPC ............... H02P 7/06; H02J 1/02; H02M 1/12; H01F 21/08
USPC ........................................................... 307/31
See application file for complete search history.

(56) References Cited

U.S. PATENT DOCUMENTS

| | | | |
|---|---|---|---|
| 6,191,676 B1 * | 2/2001 | Gabor | 336/160 |
| 7,724,549 B2 * | 5/2010 | Skibinski et al. | 363/39 |

(Continued)

FOREIGN PATENT DOCUMENTS

| | | |
|---|---|---|
| CN | 101473519 | 7/2009 |
| EP | 2 034 601 | 3/2009 |

(Continued)

OTHER PUBLICATIONS

Chinese Office Action for corresponding CN Application No. 201210495242.3, Sep. 24, 2014.

(Continued)

*Primary Examiner* — Thienvu Tran
*Assistant Examiner* — David M Stables
(74) *Attorney, Agent, or Firm* — Mori & Ward, LLP

(57) ABSTRACT

A load driving device includes a power storage device, a first power converter, a ring-shaped filter, a first output-side power line, and a first input-side power line. The first output-side power line extends through an opening so that a first output-side common mode current caused by switching the first switching element flows inside the opening through the first output-side power line in a first output-side flow direction. The first input-side power line extends through the opening so that a first input-side common mode current caused by switching the first switching element flows inside the opening through the first input-side power line in a first input-side flow direction same as the first output-side flow direction.

8 Claims, 10 Drawing Sheets

(51) Int. Cl.
*H02J 3/01* (2006.01)
*H02J 4/00* (2006.01)

(56) References Cited

U.S. PATENT DOCUMENTS

2007/0241702 A1* 10/2007 Youkai et al. .......... 318/254
2009/0284199 A1* 11/2009 Kitanaka .......... H02M 1/12
   318/400.24

FOREIGN PATENT DOCUMENTS

JP    63-156539 U    10/1988
JP    2001-268890    9/2001
WO    WO 2008/001427    1/2008

OTHER PUBLICATIONS

Japanese Office Action for corresponding JP Application No. 2011-287804, Oct. 7, 2014.

* cited by examiner

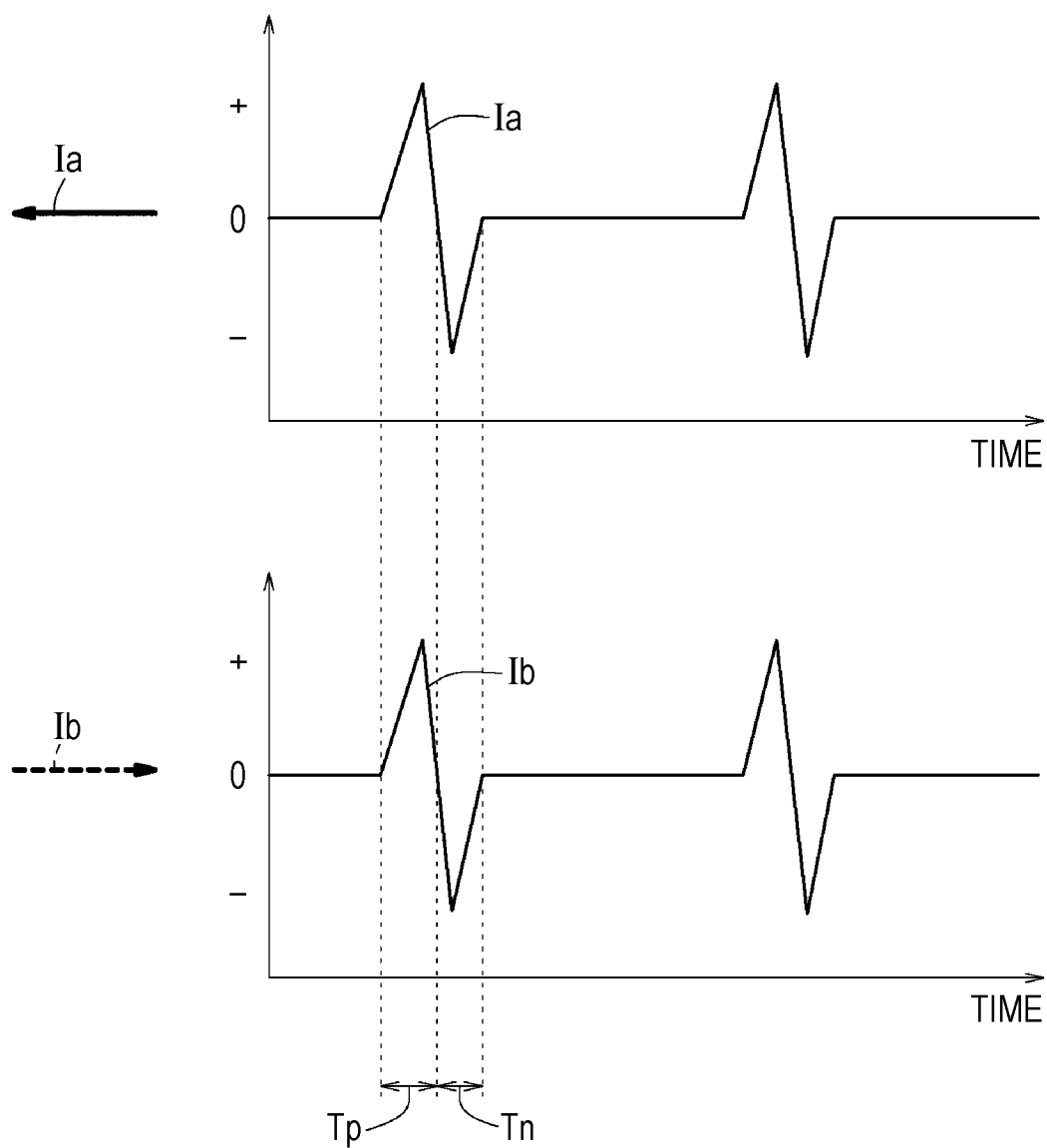

LOAD DRIVING DEVICE

CROSS-REFERENCE TO RELATED APPLICATIONS

The present application claims priority under 35 U.S.C. §119 to Japanese Patent Application No. 2011-287804, filed Dec. 28, 2011, entitled "Load Driving Device." The contents of this application are incorporated herein by reference in their entirety.

BACKGROUND OF THE INVENTION

1. Field of the Invention

The present disclosure relates to a load driving device.

2. Discussion of the Background

In the related art, there is a technology such as that disclosed in Japanese Unexamined Patent Application Publication No. 2001-268890 (FIG. 1, [0020]), by which in a power conversion system for supplying power from a power source to a load via a power converter, common mode noise is reduced on the input-side and output side of the power converter in such a manner that an input-side power line and an input-side common mode return line of the power converter, and an output-side power line and an output-side common mode return line of the power converter are wound over respective magnetic cores (hereinafter simply referred to as cores) in order to remove common mode noise.

SUMMARY OF THE INVENTION

According to one aspect of the present invention, a load driving device includes a power storage device, a first power converter, a ring-shaped filter, a first output-side power line, and a first input-side power line. The first power converter includes a first switching element. The ring-shaped filter defines an opening and includes a magnetic substance. The first output-side power line is to connect the first power converter to a first load. The first output-side power line extends through the opening so that a first output-side common mode current caused by switching the first switching element flows inside the opening through the first output-side power line in a first output-side flow direction. The first input-side power line is to connect the power storage device to the first power converter. The first input-side power line extends through the opening so that a first input-side common mode current caused by switching the first switching element flows inside the opening through the first input-side power line in a first input-side flow direction. The first input-side flow direction is same as the first output-side flow direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 1 illustrates schematic graphs of the common mode currents which are generated in a power converter and flow from the power converter to the input side and the output side of the power converter in a synchronized manner.

DESCRIPTION OF THE EMBODIMENTS

Figure 2A:
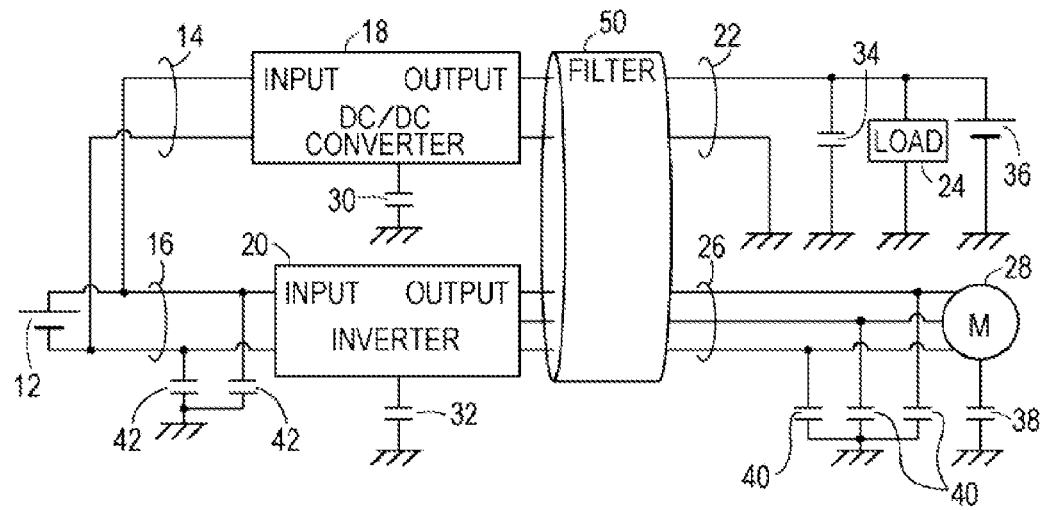
FIG. 2A is a configuration diagram of a load driving device applied to an electric motor vehicle, according to a first embodiment.

The embodiments will now be described with reference to the accompanying drawings, wherein like reference numerals designate corresponding or identical elements throughout the various drawings.

A comparative example to which the above-described conventional technology is applied will be described first in order to clarify the configuration and operation of the load driving device according to the embodiment.

Figure 11A:
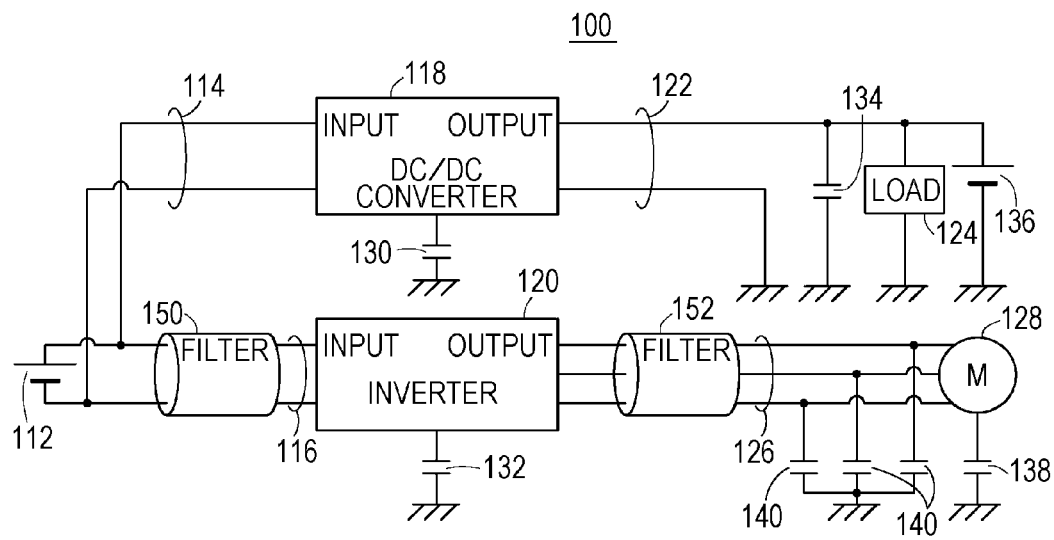
FIG. 11A is a configuration diagram of a load driving device applied to an electric motor vehicle, according to a comparative example.
Figure 11B:
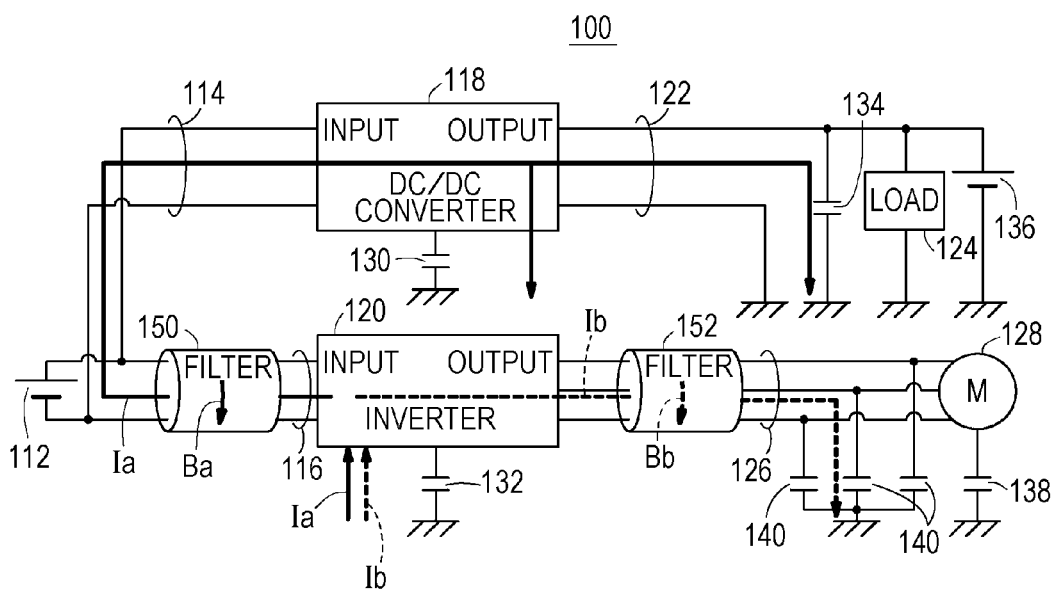
FIG. 11B is an explanatory diagram of a common mode noise reduction operation performed by the load driving device according to the comparative example.

FIG. 11A is a configuration diagram of a load driving device 100 applied to an electric motor vehicle, according to the comparative example. FIG. 11B is an explanatory diagram of a common mode noise reduction operation performed by the load driving device 100 according to the comparative example.

The load driving device 100 essentially includes a high voltage power storage device 112; a DC/DC converter 118 and an inverter 120 having input sides connected to the high voltage power storage device 112 via input-side power lines 114 and 116, respectively; a load 124 connected via output-side power lines 122 of the DC/DC converter 118; and a three phase electric motor (motor) 128 which serves as the main load and is connected via output-side power lines 126 of the inverter 120.

The DC/DC converter 118 and the inverter 120 are power converters, and are grounded through stray capacitances 130 and 132, respectively.

The load 124 is connected in parallel to a smoothing capacitor 134 and a low voltage power storage device 136.

In addition, a stray capacitance 138 is connected between the electric motor 128 and the ground, and a stray capacitance 140 is connected between each of the output-side power lines 126 and the ground.

A ring-shaped filter 150 is arranged such that input-side power lines 116 of the inverter 120 pass through the inside of the ring-shaped filter 150, and a ring-shaped filter 152 is arranged such that output-side power lines 126 of the inverter 120 pass through the inside of the ring-shaped filter 152.

In the load driving device 100 of FIG. 11A, as illustrated in FIG. 11B, the common mode current Ia (also referred to as a common mode noise for the sake of better understanding) illustrated with a thick solid line, which flows through the input-side power lines 116 of the inverter 120, and the common mode current Ib illustrated with a thick dashed line, which flows through the output-side power lines 126 of the inverter 120 are generated simultaneously by switching a switching element such as an IGBT (Insulated Gate Bipolar Transistor) which is a component of the inverter 120. The common mode current Ia reversely flowing through the input-side power lines 116 passes through the ring-shaped filter 150, the input-side power lines 114, the DC/DC converter 118, and the output-side power lines 122, and flows to the ground through the smoothing capacitor 134, the load 124, and the low voltage power storage device 136 which are connected in parallel, and returns to the inverter 120 from the ground side of the stray capacitance 132. In the above process, part of the common mode current Ia returns to the inverter 120 through the stray capacitance 130 of the DC/DC converter 118 and the stray capacitance 132.

On the other hand, the common mode current 1b passing through the output-side power lines 126 of the inverter 120 flows to the ground through the ring-shaped filter 152, the output-side power lines 126, and the stray capacitances 138, 140 connected in parallel to each other, and returns to the inverter 120 from the ground side of the stray capacitance 132.

In the above process, the densities of magnetic fluxes Ba and Bb generated in the ring-shaped filters 150 and 152 by the common mode currents Ia, Ib depend on the magnitudes of the common mode currents Ia and Ib, respectively. In general, the magnitudes (peak values) of the common mode currents Ia, Ib are different.

As illustrated as a schematic example in FIG. 1, the common mode currents Ia, Ib flow at the same timing because the sources of the common mode currents Ia, Ib are the same (the inverter 120 in the example of FIG. 11B). That is to say, the magnetic fluxes Ba, Bb in the ring-shaped filters 150, 152 are generated at the same timing because timings (intervals) Tp and Tn, in which a positive pulse and a negative pulse of the common mode currents Ia, Ib respectively flow are substantially the same and synchronized.

In the load driving device 100 of FIG. 11B, the common mode currents Ia, Ib are illustrated, for which positive pulses flow from the input side and the output side of the inverter 120 in the timing (interval) Tp, and in the subsequent timing (interval) Tn, a common mode current occurs, for which negative pulses flow into the input side and the output side of the inverter 120. In the subsequent description, in order to avoid complexity and provide better understanding, attention is basically focused on the common mode currents 1a, 1b, for which positive pulses flow from the input side and the output side of the power converter.

In the comparative examples of FIGS. 11A and 11B, in order to reduce the common mode noise which is caused by the common mode currents 1a, 1b, the ring-shaped filters 150 and 152 are needed on both sides of the source (the inverter 120 in the example of FIG. 11B), and thus the degree of freedom of layout is limited, the number of manufacturing steps is increased, and the manufacturing cost is also increased.

First Embodiment

Figure 2B:
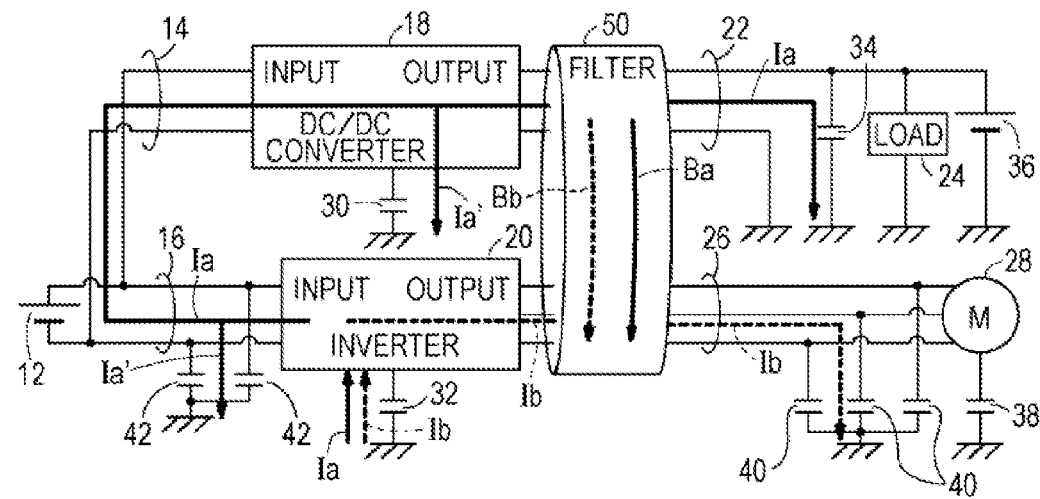
FIG. 2B is an explanatory diagram of a common mode noise reduction operation performed by the load driving device according to the first embodiment.

FIG. 2A is a configuration diagram of a load driving device 10 applied to an electric motor vehicle, according to a first embodiment. FIG. 2B is an explanatory diagram of a common mode noise reduction operation performed by the load driving device 10 according to the first embodiment.

In FIGS. 2A and 2B, the load driving device 10 essentially includes a high voltage power storage device 12 which is an energy storage such as a lithium ion secondary battery or a capacitor; a DC/DC converter 18 (power converter) and an inverter 20 (power converter) having input sides connected to the high voltage power storage device 12 through respective input-side power lines 14 and 16; a load 24 (auxiliary load) connected via output-side power lines 22 of the DC/DC converter 18; and a three phase electric motor (motor) 28 which serves as the main load and is connected via output-side power lines 26 of the inverter 20.

The output shaft of the electric motor 28 is engaged with driving wheels via a transmission which is not illustrated.

The DC/DC converter 18 and the inverter 20 are grounded through stray capacitances 30 and 32, respectively.

A smoothing capacitor 34 and a low voltage power storage device 36 are connected in parallel to the load 24, the low voltage power storage device 36 being an energy storage which is a secondary battery such as a lead battery.

In addition, a stray capacitance 38 is connected between the electric motor 28 and the ground, and a stray capacitance 40 is connected between each of the output-side power lines 26 and the ground.

A stray capacity 42 is also connected between each of the input-side power lines 16 of the inverter 20 and the ground.

A common ring-shaped filter 50 composed of a magnetic substance is arranged such that the output-side power lines 22 of the DC/DC converter 18 and the output-side power lines 26 of the inverter 20 pass through the inside of the ring-shaped filter 50.

In the load driving device 10 of FIG. 2A, as illustrated in FIG. 2B, the common mode current Ia which flows through the input-side power lines 16 of the inverter 20 and the common mode current Ib which flows through the output-side power lines 26 of the inverter 20 are generated simultaneously by switching a switching element such as an IGBT (Insulated Gate Bipolar Transistor) which is a component of the inverter (see also FIG. 1).

The common mode current Ia reversely flowing (i.e., flowing in the reverse direction of the flow direction of a so-called normal mode current which flows out from the high voltage power storage device 12 and flows in the input of the inverter 20) through the input-side power lines 16 of the inverter 20 passes through the input-side power lines 14 of the DC/DC converter 18, the DC/DC converter 18 as well as the ring-shaped filter 50 and the output-side power lines 22, and flows to the ground through the smoothing capacitor 34, the load 24, and the low voltage power storage device 36 which are connected in parallel, and returns to the inverter 20 from the ground side of the stray capacitance 32.

In the above process, a common mode current Ia' which is part of the common mode current Ia flows to the ground through the stray capacitances 42 of the input-side power lines 16 and the stray capacitance 30 of the DC/DC converter 18, and returns to the inverter 20 from the ground side of the stray capacitance 32. In general, the impedance of the stray capacitances 30, 42 at the target frequency (pulse frequency in FIG. 1) of the common mode current Ia' is higher than the impedance of the path on which the common mode current Ia flows, and thus a relationship of Ia'<<Ia is satisfied.

On the other hand, the common mode current Ib passing through the output-side power lines 26 of the inverter 20 flows to the ground through the ring-shaped filter 50, the output-side power lines 26 as well as the electric motor 28, the stray capacitance 38, and the stray capacitances 40, and returns to the inverter 20 from the ground side of the stray capacitance 32, where the electric motor 28, the stray capacitance 38, and the stray capacitances 40 are connected in parallel to each other.

In the above process, the density of magnetic flux Ba and the density of magnetic flux Bb respectively caused by the common mode currents Ia and Ib which are generated in the ring-shaped filter 50 depend on the magnitudes of the common mode currents Ia and Ib, respectively.

As illustrated in FIG. 1, the common mode currents Ia, Ib flow at the same timing because the sources of the common mode currents Ia, Ib are the same, which is the inverter 20. That is to say, the magnetic fluxes Ba, Bb which flow in the circumferential direction of the ring-shaped filter 50 illustrated in FIG. 2B are generated at the same timing because timings (intervals) Tp and Tn, in which a positive pulse and a negative pulse of the common mode currents Ia, Ib respectively flow are substantially the same and synchronized.

The load driving device 10 according to the first embodiment includes the DC/DC converter 18 which branches off from the high voltage power storage device 12, and is another power converter connected in parallel to the inverter 20 which is a power converter. The DC/DC converter 18 is connected to the load 24 which is another load that is different from the electric motor 28, and the output-side power lines of the inverter 20 and the output-side power lines 22 of the DC/DC converter 18 are made to pass through the inside of the single ring-shaped filter 50 in such a manner as to have the same flow directions as the common mode currents Ia, Ib.

As illustrated in FIG. 2B, when the common mode currents Ia, Ib from the input side and the output side of the inverter 20 pass through the inside of the ring-shaped filter 50, the directions of magnetic fluxes Ba, Bb are the same, and thus the common mode noise, which is caused by the common mode currents Ia, Ib flowing from the input side and the output side, can be efficiently reduced with a simple configuration of the single ring-shaped filter 50 because the common mode currents Ia, Ib flow into the single ring-shaped filter 50 from the input side and the output side.

As described below, a common mode current which is generated in the DC/DC converter 18 and flows from the DC/DC converter 18 to the input-side power lines 14, as well as a common mode current which is generated in the DC/DC converter 18 and flows from the DC/DC converter 18 to the output-side power lines 22 pass through the inside of the ring-shaped filter 50 in such a manner as to have the same flow direction. Thus the magnetic fluxes (below-described magnetic fluxes Bc, Bd) generated in the ring-shaped filter 50 by the common mode currents flowing from the input side and the output side of the DC/DC converter 18 have the same direction, and in this case, the common mode noise can be even more efficiently reduced with a simple configuration.

The input-side power lines 14, 16 and the output-side power lines 22, 26 are each referred to as a "power line," however, this is for the sake of understanding the present embodiment, and the embodiment may be applied without being dependent on the wire diameter of the "power line." It is needless to say that the embodiment may be similarly applied using a bus bar instead of the "power line." That is to say, the present embodiment may be applied using not only a power line but also a wire which is conductive.

Reduction Principle for Common Mode Noise

Here, the reduction principle of common mode noise is described. The noise is converted into heat and is reduced due to the iron loss of a magnetic substance (magnetic material). The iron loss is a combination of hysteresis loss and eddy-current loss.

As widely known, the magnetization direction of the magnetic substance varies as an alternating field is applied to the magnetic substance, and thus the hysteresis loss is an energy loss due to internal friction of atoms or molecules, and is consumed as heat.

Figure 3:
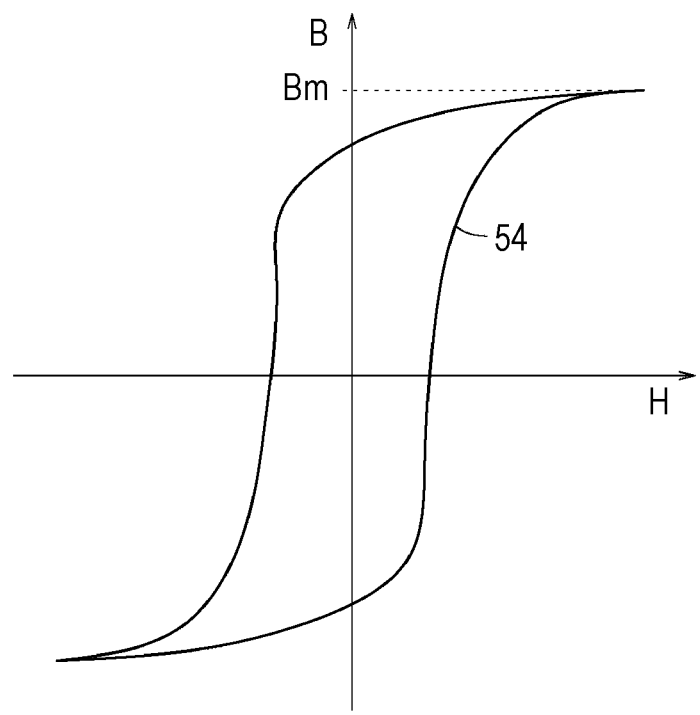
FIG. 3 is an explanatory diagram of the B-H curve which is used for description of hysteresis loss.

In the B-H curve in FIG. 3, the area of a hysteresis loop 54 indicates the hysteresis loss per period where the hysteresis loop 54 is a curve illustrated in the coordinate system of magnetic field strength H and flux density B when an alternating field is applied to the magnetic substance. The hysteresis loss Ph is given by the following expression (1) known as Steinmetz's empirical formula.

$$Ph = kh \cdot f \cdot Bm^{1.6} \quad (1)$$

where kh is the hysteresis constant, f is the frequency [Hz] of the alternating field, and Bm is the maximum magnetic flux density [T].

Figure 4:
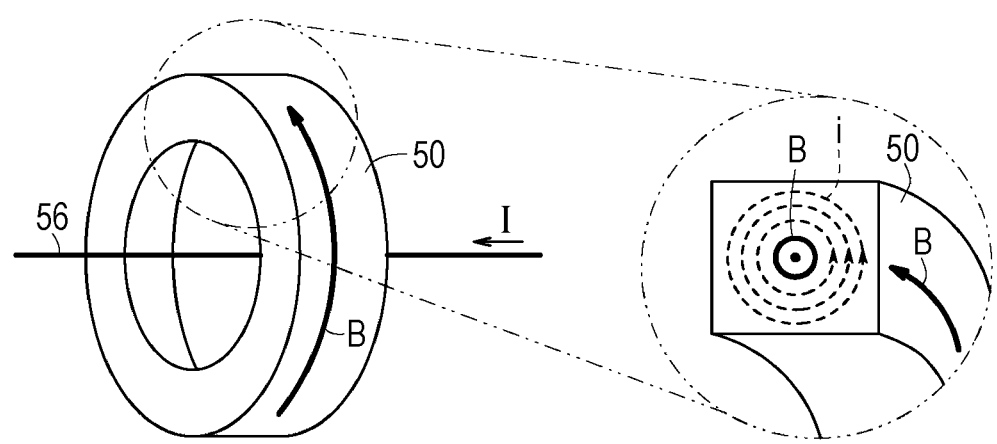
FIG. 4 is a schematic diagram which is used for description of eddy-current loss.

Next, as illustrated in the schematic diagram of FIG. 4, eddy-current loss occurs such that when time-varying magnetic flux B is generated in a magnetic substance such as the ring-shaped filter 50, eddy current i flows around the axis of the magnetic flux B as the center line. An eddy-current loss Pe is caused by Joule's heat which is generated due to the electric resistance of the magnetic substance against the flow of the eddy current i.

When a common mode current I flows through a power line 56 illustrated in FIG. 4, the magnetic flux B corresponding to the common mode current I is generated in the right-hand screw direction around the power line 56, and when the magnetic flux B passes through the inside of the magnetic substance, an eddy current i according to the magnetic flux B flows in the right-hand screw direction.

The eddy-current loss Pe is given by the following expression (2).

$$Pe = ke \cdot Bm^2 \cdot f^2 \quad (2)$$

where ke is the eddy-current loss factor, Bm is the maximum magnetic flux density [T], and f is the frequency [Hz] of the alternating field.

Thus, noise reduction can be performed in the magnetic substance based on iron loss Ploss (hysteresis loss+eddy-current loss) given by the following expression (3).

$$Ploss = Ph + Pe = kh \cdot f \cdot Bm^{1.6} + ke \cdot Bm^2 \cdot f^2 \quad (3)$$

That is to say, the common mode noise is converted into heat and is reduced by the magnetic flux B flowing through the ring-shaped filter 50 which is a magnetic substance, the magnetic flux B being caused by the common mode current I.

So far, the reduction principle of common mode noise has been described. In the above-described example of FIG. 2B, the common mode current Ia and the common mode current Ib synchronously flow in the same direction through the ring-shaped filter 50 of a magnetic substance, and thus the magnetic flux which flows through the ring-shaped filter 50 which is a magnetic substance becomes the composite magnetic flux of the magnetic flux Ba and the magnetic flux Bb, and therefore the loss (the iron loss Ploss) accumulates and increases. Accordingly, the common mode noise is reduced.

Thus, in contrast with the conventional technology, the common mode noise can be more efficiently removed with the single ring-shaped filter 50.

As described in more detail in the below-described third embodiment (see FIG. 8), in order to generate the common mode currents Ic, Id (see FIG. 8) of the DC/DC converter 18 in synchronization with the common mode currents Ia, Ib which are generated from the inverter 20, a common clock is frequency-divided, and a switching clock of the inverter 20 and a switching clock of the DC/DC converter 18 are generated, thereby synchronizing the common mode currents of the inverter 20 and the DC/DC converter 18 without fail at common multiple periods of the above clocks. Consequently, the common mode noise can be further reduced at the synchronized periods.

The load driving device 10 in FIGS. 2A and 2B may be applied to various types of electric motor vehicles. For example, the load driving device 10 may be applied to a fuel cell vehicle with fuel cells in addition to an electric vehicle on which the high voltage power storage device 12 and the electric motor 28 driven via the high voltage power storage device 12 are mounted, a hybrid vehicle with an engine mounted, and a plug-in hybrid vehicle with a charging device mounted.

Second Embodiment

Next, a second embodiment will be described. Including the second embodiment, in the below-described third to fifth embodiments, the same components as or corresponding components to those illustrated in the above-described first embodiment are labeled with the same reference symbols, and detailed description thereof is omitted.

Figure 5A:
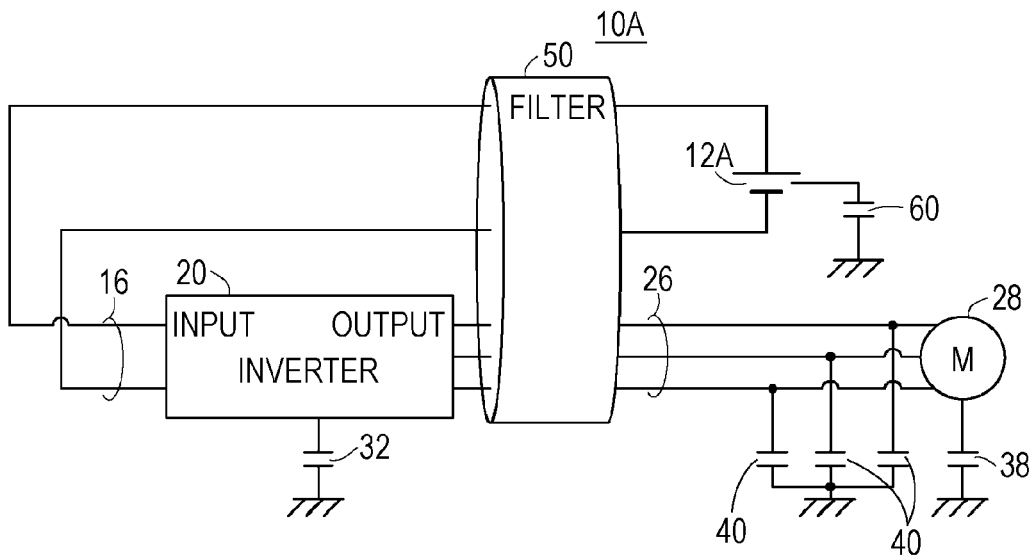
FIG. 5A is a configuration diagram of a load driving device according to a second embodiment.
Figure 5B:
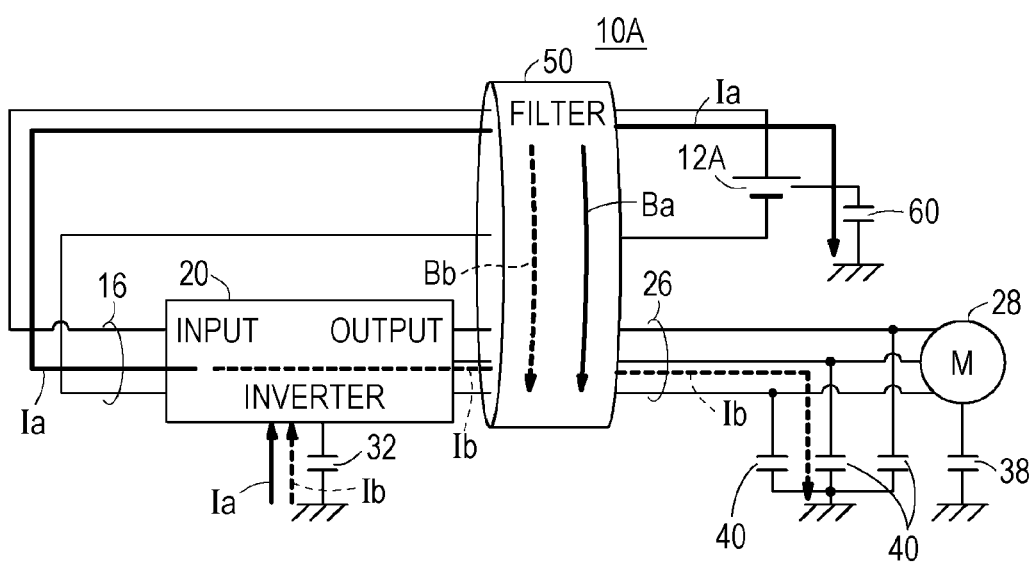
FIG. 5B is an explanatory diagram of a common mode noise reduction operation performed by the load driving device according to the second embodiment.

FIG. 5A is a configuration diagram of a load driving device 10A in the second embodiment, which is not limited to an electric motor vehicle, and in which the electric motor 28 is driven by the DC power supply 12A (which may be a power storage device) via the inverter 20. FIG. 5B is an explanatory diagram of a common mode noise reduction operation performed by the load driving device 10A according to the second embodiment.

As an example, the load driving device 10A may be used as a driving device for driving an electric motor 28 for a cooling fan of an electronic device such as a notebook personal computer driven by the DC power supply 12A (power storage device such as a lithium ion secondary battery) via the inverter 20, or for driving an electric motor 28 for an electric compressor which supplies compressed air to a fuel cell stack by a fuel cell (which may be the DC power supply 12A).

In FIGS. 5A and 5B, the load driving device 10A essentially includes the inverter 20 (power converter); the input-side power lines 16 having one end connected to the input side of the inverter 20; the DC power supply 12A connected to the other end of the input-side power lines 16; the three phase output-side power lines 26 having one end connected to the output side of the inverter 20; the electric motor 28 as a load connected to the other end of the output-side power lines 26; and the common ring-shaped filter 50 composed of a magnetic substance is arranged such that the output-side power lines 26 and the input-side power lines 16 are made to pass through the inside of the ring-shaped filter in such a manner as to have the same flow directions as the common mode currents Ia, Ib which respectively flow through the output-side power lines 26 and the input-side power lines 16 by switching the switching element of the inverter 20.

The DC power supply 12A and the inverter 20 are grounded through the stray capacitance 60 and 32, respectively.

In addition, the stray capacitance 38 is connected between the electric motor 28 and the ground, and the stray capacitance 40 is connected between each of the output-side power lines 26 and the ground.

As illustrated in FIG. 5B, in the load driving device 10A of FIG. 5A, the common mode current Ia illustrated with a thick solid line, which flows through the input-side power lines 16 of the inverter 20, and the common mode current Ib illustrated with a thick dashed line, which flows through the output-side power lines 26 of the inverter 20 are generated simultaneously by switching the switching element of the inverter 20.

The common mode current Ia reversely flowing through the input-side power lines 16 of the inverter 20 passes through the ring-shaped filter 50, the DC power supply 12A, and the stray capacitance 60, and flows to the ground, and returns to the inverter 20 from the ground side of the stray capacitance 32.

On the other hand, the common mode current Ib passing through the output-side power lines 26 of the inverter 20 flows to the ground through the ring-shaped filter 50, the output-side power lines 26, the electric motor 28, the stray capacitance 38, and the stray capacitances 40, and returns to the inverter 20 from the ground side of the stray capacitance 32, where the electric motor 28, the stray capacitance 38, and the stray capacitances 40 are connected in parallel to each other.

In the above process, the densities of magnetic fluxes Ba, Bb generated in the ring-shaped filter 50 by the common mode currents Ia, Ib depend on the magnitudes of the common mode currents Ia and Ib, respectively. However, as described with reference to FIG. 1, the magnetic fluxes Ba and Bb are generated at the same timing, and the directions of the magnetic fluxes are the same, and thus the removal effect of the common mode noise increases.

Consequently, also in the load driving device 10A according to the second embodiment, the common mode noise generated in both input and output sides of the inverter 20 can be efficiently removed with a simple configuration of the single ring-shaped filter 50.

Third Embodiment

Next, a third embodiment will be described.

Figure 6:
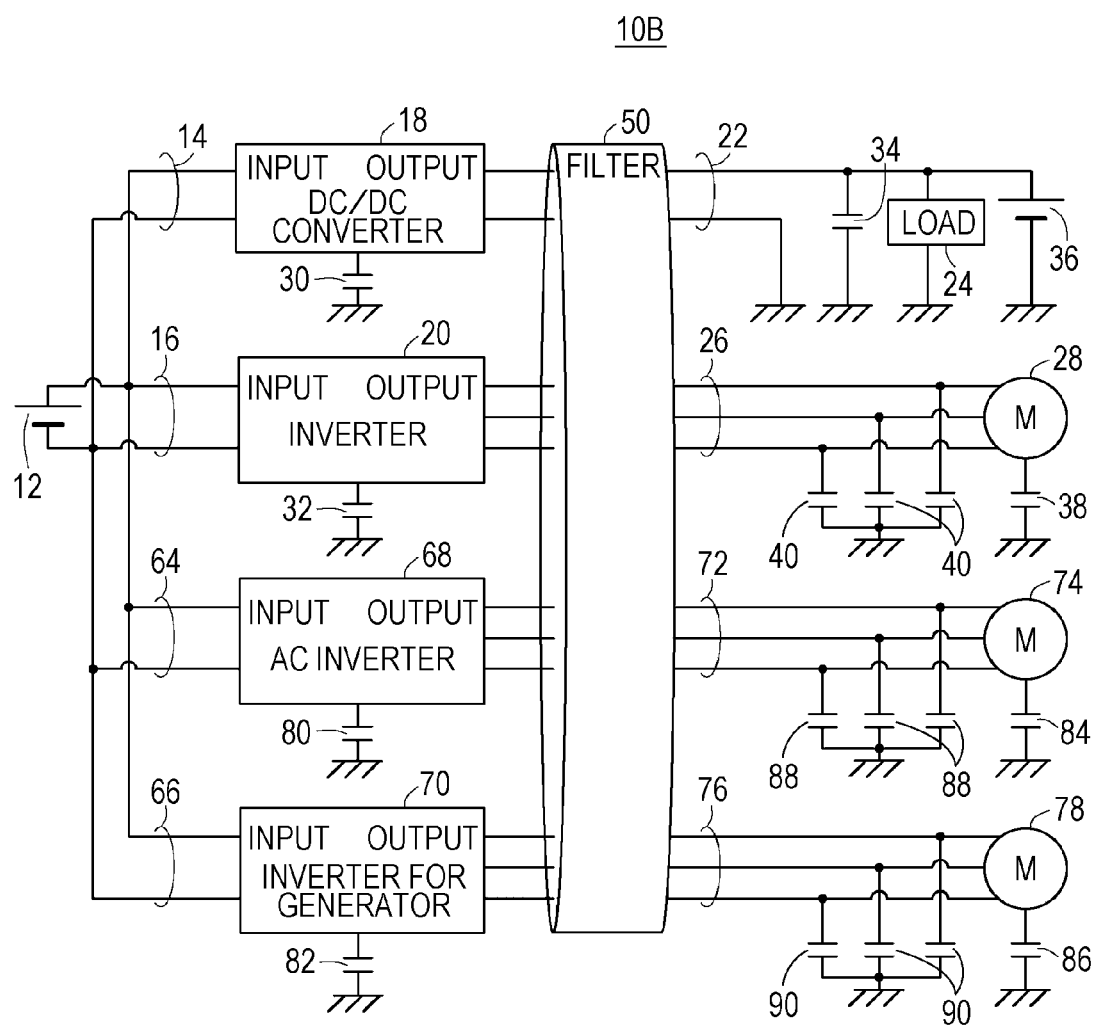
FIG. 6 is a configuration diagram of a load driving device according to a third embodiment.
Figure 7:
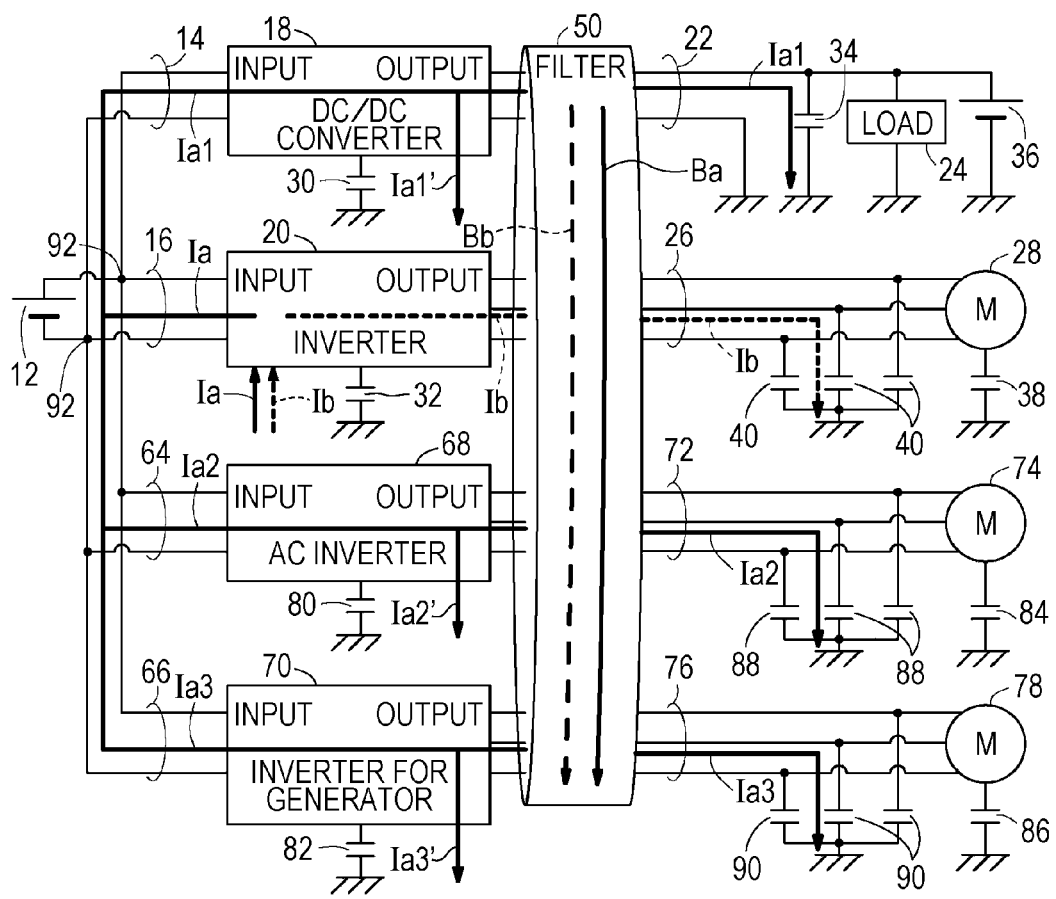
FIG. 7 is an explanatory diagram of a common mode noise reduction operation performed by the load driving device according to the third embodiment.

FIG. 6 is a configuration diagram of a load driving device 10B applied to an electric motor, according to the third embodiment. FIG. 7 is an explanatory diagram of a common mode noise reduction operation performed by the load driving device 10B according to the third embodiment.

In FIGS. 6 and 7, the load driving device 10B essentially includes the high voltage power storage device 12; the DC/DC converter 18 (power converter), the inverter 20 (power converter), an inverter for air conditioner (A/C inverter) 68 (power converter), and an inverter for generator (GEN inverter) 70 having input sides connected to the high voltage power storage device 12 via input-side power lines 14, 16, 64, 66, respectively; the load 24 (auxiliary load) connected via the output-side power lines 22 of the DC/DC converter 18; the three phase electric motor (motor) for front-wheel drive 28 which serves as the main load and is connected via the output-side power lines 26 of the inverter 20; an electric motor for electric compressor 74 connected via output-side power lines 72 of the inverter for air conditioner 68; and an electric motor for rear-wheel drive 78 connected via output-side power lines 76 of the inverter for generator 70.

The DC/DC converter 18, the inverter 20, the inverter for air conditioner 68, and the inverter for generator 70 are grounded through stray capacitances 30, 32, 80, 82, respectively.

A smoothing capacitor 34 and a low voltage power storage device 36 are connected in parallel to the load 24.

In addition, stray capacitances 38, 84, 86 are respectively connected between the electric motors 28, 74, 78 and the ground, and stray capacitances 40, 88, 90 are respectively connected between each of the output-side power lines 26, 72, 76, and the ground.

A common ring-shaped filter 50 composed of a magnetic substance is arranged such that the output-side power lines 22 of the DC/DC converter 18, the output-side power lines 26 of the inverter 20, the output-side power lines 72 of the inverter for air conditioner 68, and the output-side power lines 76 of the inverter for generator 70 pass through the inside of the ring-shaped filter 50.

As illustrated in FIG. 7, in the load driving device 10B of FIG. 6, the common mode current Ia illustrated with a thick solid line, which flows through the input-side power lines 16 of the inverter 20, and the common mode current Ib illustrated with a thick dashed line, which flows through the output-side power lines 26 of the inverter 20 are generated simultaneously by switching the switching element of the inverter 20.

The common mode current Ia reversely flowing through the input-side power lines 16 of the inverter 20 branches to common mode currents Ia1, Ia2, Ia3 at a connection point 92.

The branched common mode current Ia1 flows through the input-side power lines 14 of the DC/DC converter 18 and the DC/DC converter 18 as well as the ring-shaped filter 50 and the output-side power lines 22, and flows to the ground through the smoothing capacitor 34, the load 24, and the low voltage power storage device 36 which are connected in parallel, and returns to the inverter 20 from the ground side of the stray capacitance 32.

In the above process, a common mode current Ia1' which is part of the common mode current Ia1 flows to the ground through the stray capacitance 30 of the DC/DC converter 18, and returns to the inverter 20 from the ground side of the stray capacitance 32.

The branched common mode current Ia2 then passes through input-side power lines 64 of the inverter for air conditioner 68 and the inverter for air conditioner 68, and flows to the ground through the ring-shaped filter 50, the output-side power lines 72, the electric motor 74, a stray capacitance 84, and stray capacitances 88, and returns to the inverter 20 from the ground side of the stray capacitance 32, where the electric motor 74, the stray capacitance 84, and the stray capacitances 88 are connected in parallel to each other.

In the above process, a common mode current Ia2' which is part of the common mode current Ia2 flows to the ground through a stray capacitance 80 of the inverter for air conditioner 68, and returns to the inverter 20 through the stray capacitance 32.

The branched common mode current Ia2 passes through input-side power lines 66 of the inverter for generator 70 and the inverter for generator 70, and flows to the ground through the ring-shaped filter 50, the output side power lines 76, an electric motor 78, a stray capacitance 86, and stray capacitances 90, and returns to the inverter 20 from the ground side of the stray capacitance 32, where the electric motor 78, the stray capacitance 86, and the stray capacitances 90 are connected in parallel to each other.

In the above process, a common mode current Ia3' which is part of the common mode current Ia3 flows to the ground through a stray capacitance 82 of the inverter for generator 70, and returns to the inverter 20 through the stray capacitance 32.

On the other hand, the common mode current Ib passing through the output-side power lines 26 of the inverter 20 flows to the ground through the ring-shaped filter 50, the output-side power lines 26, the electric motor 28, the stray capacitance 38, and the stray capacitances 40, and returns to the inverter 20 from the ground side of the stray capacitance 32, where the electric motor 28, the stray capacitance 38, and the stray capacitances 40 are connected in parallel to each other.

Then, the density of the magnetic flux Ba caused by the common mode currents Ia1, Ia2, Ia3 generated in the ring-shaped filter 50, and the density of the magnetic flux Bb caused by the common mode current Ib generated in synchronization with the currents Ia1, Ia2, Ia3 each depends on the magnitudes of the common mode currents Ia1, Ia2, Ia3, Ib.

As illustrated in FIG. 1, the common mode currents Ia, Ib flow at the same timing because the sources of the common mode currents Ia, Ib are the same, which is the inverter 20. That is to say, the magnetic fluxes Ba, Bb illustrated in FIG. 7 are generated at the same timing because timings (intervals) Tp and Tn, in which a positive pulse and a negative pulse of the common mode currents Ia, Ib respectively flow are substantially the same and synchronized.

That is to say, the load driving device 10B according to the third embodiment includes the DC/DC converter 18 which branches off from the high voltage power storage device 12, and is another power converter connected in parallel to the inverter 20 which is a power converter; the inverter for air conditioner 68; and the inverter for generator 70.

The DC/DC converter 18, the inverter for air conditioner 68, and the inverter for generator 70 are respectively connected to the load 24, the electric motors 74 and 78 which are other loads different from the electric motor 28 which is the load for the inverter 20. The output-side power lines 26 of the inverter 20, and the output-side power lines 22, 72, 76 of the DC/DC converter 18, the inverter for air conditioner 68, the inverter for generator 70 are made to pass through the inside of the single ring-shaped filter 50 in such a manner as to have the same flow directions as the common mode currents Ia1, Ia2, Ia3, Ib.

As illustrated in FIG. 7, when the common mode currents Ia (≈Ia1+Ia2+Ia3), Ib from the input side and the output side of the inverter 20 pass through the inside of the ring-shaped filter 50, the directions of the magnetic fluxes Ba, Bb are the same, and thus the common mode noise can be efficiently reduced with a simple configuration of the single ring-shaped filter 50 in the load driving device 10B according to the third embodiment.

Figure 8:
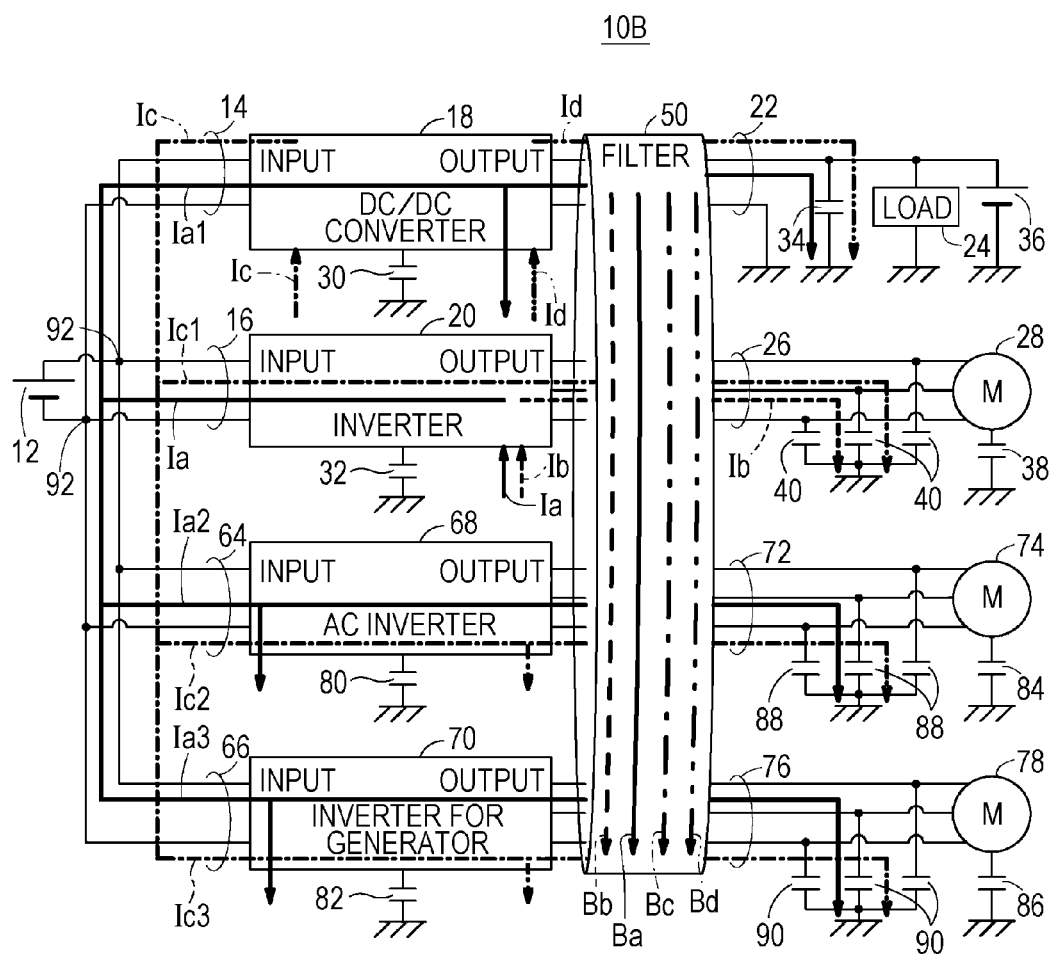
FIG. 8 is an explanatory diagram illustrating, with reference to FIGS. 6 and 7, another exemplary operation performed by the load driving device according to the third embodiment.

FIG. 8 is an explanatory diagram illustrating, with reference to FIGS. 6 and 7, another exemplary operation performed by the load driving device 10B according to the third embodiment.

In FIG. 8, it is assumed that the common mode currents Ia, Ib generated from the inverter 20, and the common mode currents Ic, Id generated from the DC/DC converter 18 are synchronized (synchronized at least once in a predetermined time interval) by switching with the clocks obtained, for example, by frequency-dividing a common clock by different frequency division ratios as described above.

In the load driving device 10B according to the third embodiment, when the common mode currents Ia, Ic from respective input sides of the inverter 20 and the DC/DC converter 18, and the common mode currents Ib, Id from respective output sides of the inverter 20 and the DC/DC converter 18 pass through the inside of the common ring-shaped filter 50, the magnetic flux Ba (due to the common mode current Ia≈Ia1+Ia2+Ia3), and the magnetic flux Bb (due to the common mode current Ib) have the same direction of magnetic flux, or the magnetic flux Bc (due to the common mode current Ic≈Ic1+Ic2+Ic3), and the magnetic flux Bd (due to the common mode current Id) have the same direction of magnetic flux, and thus the common mode noise can be efficiently reduced with a simple configuration.

In addition, because a configuration is provided in which the common mode currents Ia, Ib, Ic, Id are made to pass through the common ring-shaped filter 50 all together, when the common mode currents Ia, Ib, and the common mode currents Ic, Id are in the same timing, i.e., are synchronized, the effect of reduction in the common mode noise is further improved.

Fourth Embodiment

The load driving device 10 according to the first embodiment illustrated in FIGS. 2A and 2B has a configuration in which the output-side power lines 22 of the DC/DC converter 18 and the output-side power lines 26 of the inverter 20 are made to pass through the ring-shaped filter 50 all together. However, there may be a case where the DC/DC converter 18 and the inverter 20 need to be arranged apart from each other because of the spatial relationship.

In this case, by arranging the ring filter 50 as in the fourth embodiment or the fifth embodiment described below, a relatively high effect in reduction of the common mode noise can be obtained in contrast with the conventional technology even though not comparable to the effect in the second embodiment.

Figure 9:
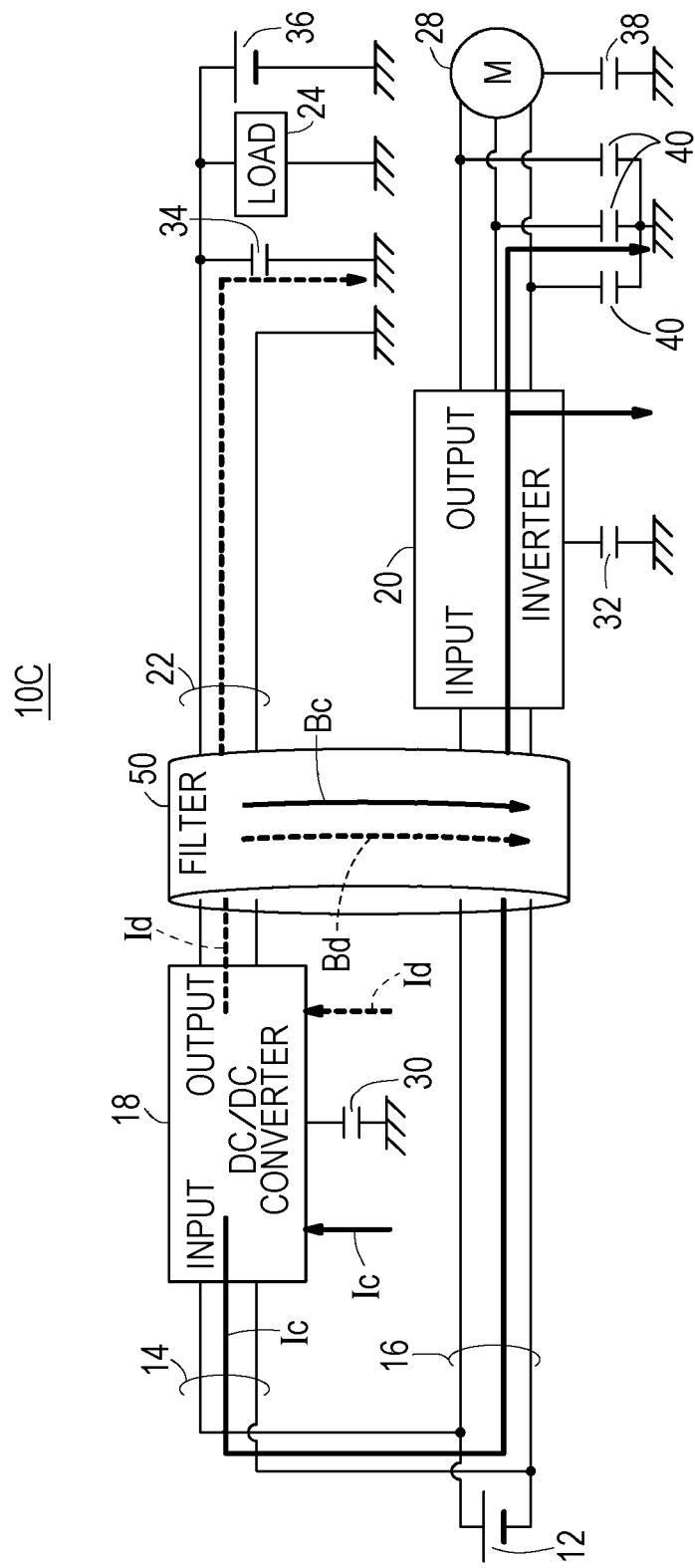
FIG. 9 is an explanatory diagram which is used for description of the configuration of a load driving device according to a fourth embodiment and of a common mode noise reduction operation performed by the load driving device.

FIG. 9 is an explanatory diagram which is used for description of the configuration of a load driving device 10C according to the fourth embodiment and of a common mode noise reduction operation performed by the load driving device 10C. The load driving device 10C has a configuration in which the output-side power lines 22 of the DC/DC converter 18 and the input-side power lines 16 of the inverter 20 are made to pass through the ring-shaped filter 50 all together.

In the fourth embodiment, the magnetic fluxes Bc, Bd are generated in the same direction in the ring-shaped filter 50 for the common mode currents Id, Ic flowing from the input/output sides of the DC/DC converter 18, and thus a higher effect in reduction of the common mode noise can be obtained in contrast with the conventional technology. However, the magnetic fluxes generated in the ring-shaped filter 50 have opposite directions (not illustrated) for the common mode currents Ia, Ib (not illustrated) generated from the inverter 20, and thus no effect is obtained for the common mode noise of the inverter 20.

Fifth Embodiment

Figure 10:
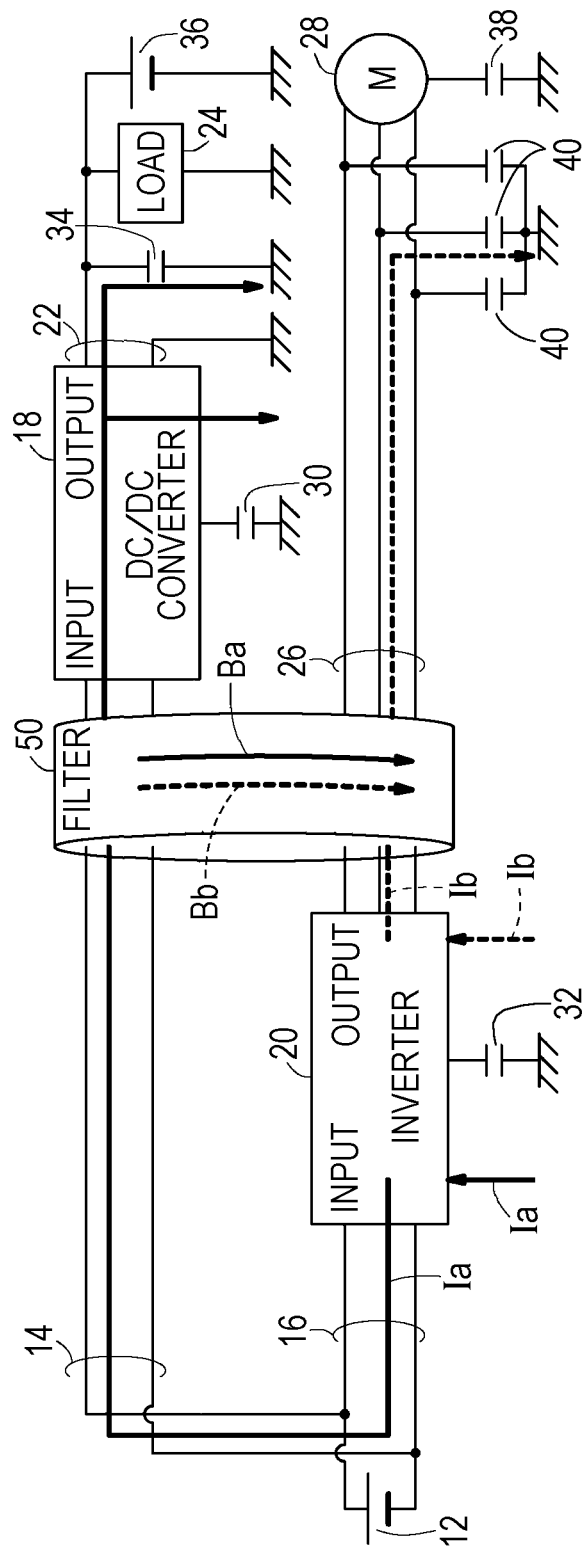
FIG. 10 is an explanatory diagram which is used for description of the configuration of a load driving device according to a fifth embodiment and of a common mode noise reduction operation performed by the load driving device.

FIG. 10 is an explanatory diagram which is used for description of the configuration of a load driving device 10D according to a fifth embodiment and of a common mode noise reduction operation performed by the load driving device 10D. The load driving device 10D has a configuration in which the input-side power lines 14 of the DC/DC converter 18 and the output-side power lines 26 of the inverter 20 are made to pass through the ring-shaped filter 50 all together.

In the fifth embodiment, the magnetic fluxes Ba, Bb are generated in the same direction in the ring-shaped filter 50 for the common mode currents Ia, Ib flowing from the input/output sides of the inverter 20, and thus a higher effect in reduction of the common mode noise can be obtained in contrast with the conventional technology. However, the magnetic fluxes generated in the ring-shaped filter 50 have opposite directions (not illustrated) for the common mode currents Ic, Id (not illustrated) generated from the DC/DC converter 18, and thus no effect is obtained for the common mode noise of the DC/DC converter 18.

It is needless to say that the embodiments are not limited to what has been described, and various configurations may be adopted based on the description herein.

A load driving device according to the embodiment supplies the power of a power storage device to a load via a power converter containing a switching element, and drives the load. The load driving device of the embodiment has the following aspects [1] to [4].

[1] For example, as illustrated in FIG. 5B, the load driving device of the embodiment includes output-side power lines (26) for connecting a power converter (inverter 20) to a load (electric motor 28), input-side power lines (16) for connecting the power storage device (DC power supply 12A) to the power converter (the inverter 20), and a ring-shaped filter (50) composed of a magnetic substance. The power lines (26, 16) are made to pass through the ring-shaped filter (50) in such a manner as to have the same flow directions as common mode currents (Ia, Ib) which flow through the output-side power lines (26) and the input-side power lines (16) by switching the switching element of the power converter (the inverter 20).

According to the embodiment having the aspect [1], a configuration is provided such that the power lines are made to pass through the inside of the ring-shaped filter in such a manner as to have the same flow directions as the common mode currents which flow through the output-side power lines and the input-side power lines of the power converter, and thus the direction of any magnetic flux generated in the ring-shaped filter are the same, and the removal effect of the common mode noise increases.

Consequently, the common mode noise generated in both input and output sides of the power converter can be simultaneously removed efficiently with a simple configuration of the single ring-shaped filter.

In addition to a circular ring shape, the ring-shaped filter may have a polygonal ring shape such as a triangular ring shape or a quadrilateral ring shape. The ring-shaped filter may be provided with an air gap (opening) in the axis direction thereof by cutting part of the ring-shaped filter in a slit form.

[2] In the embodiment having the above-described aspect [1], for example, as illustrated in FIGS. 9 and 10, the load driving device of the embodiment further includes another power converter (DC/DC converter 18) which branches off from the power storage device (12), and is connected in parallel to the power converter (the inverter 20). The another power converter (the DC/DC converter 18) is connected to other load (24) which is different from the load (the electric motor 28), and the input-side power lines (16) of the power converter (the inverter 20) and the output-side power lines (22) of the another power converter (the DC/DC converter 18) and/or the output-side power lines (26) of the power converter (the inverter 20) and the input-side power lines (14) of the another power converter (the DC/DC converter 18) are made to pass through the inside of the ring-shaped filter (50) in such a manner as to have the same flow directions as the common mode currents (such as Ib).

According to the embodiment having the aspect [2], in the case where the load driving device includes a plurality of power converters (the DC/DC converter 18, the inverter 20), first, for example, as illustrated in FIG. 9, the input-side power lines (16) of one of the power converters (the inverter 20) and the output-side power lines (22) of the other of the power converters (the DC/DC converter 18) are made to pass through the single ring-shaped filter (50); second, for example, as illustrated in FIG. 10, the output-side power lines (26) of one of the power converters (the inverter 20) and the input-side power lines (14) of the other of the power converters (the DC/DC converter 18) are made to pass through the single ring-shaped filter (50); or third, for example, with a configuration (not illustrated) combining the configurations of FIGS. 9 and 10, i.e., the input-side power lines (16) of one of the power converters (the inverter 20) and the output-side power lines (22) of the other of the power converters (the DC/DC converter 18) are made to pass through the single ring-shaped filter (50) (FIG. 9), and the output-side power lines (26) of one of the power converters (the inverter 20) and the input-side power lines (14) of the other of the power converters (DC/DC converter 18) are made to pass through the single ring-shaped filter (50) (FIG. 10), thereby providing a combined configuration in which the flow directions of the common mode currents are the same on the input side or the output side of the power converters (the inverter 20, the DC/DC converter 18). Consequently, the common mode noise can be removed more efficiently.

[3] In the embodiment having the above-described aspect [1], for example, as illustrated in FIG. 2B, the load driving device of the embodiment further includes another power converter (DC/DC converter 18) which branches off from the power storage device (12), and is connected in parallel to the power converter (the inverter 20). The another power converter (the DC/DC converter 18) is connected to the other load (24) which is different from the load (the electric motor 28), and the output-side power lines (26) of the power converter (the inverter 20) and the output-side power lines (22) of the another power converter (the DC/DC converter 18) are made to pass through the inside of the ring-shaped filter (50) in such a manner as to have the same flow directions as the common mode currents (Ia, Ib).

According to the embodiment having the aspect [3], when the common mode currents from the input side and the output side of the power converter and the another power converter pass through the inside of the ring-shaped filter, the directions of generated magnetic fluxes are the same, and thus the common mode noise can be efficiently reduced with a simple configuration.

[4] In the embodiment having the above-described aspect [2] or [3], for example, as illustrated in FIG. 8, a configuration is provided such that switching times of the power converter (the inverter 20) and the another power converter (DC/DC converter 18) are controlled to be synchronized once or more within a predetermined time interval, thereby increasing the flux density when switching times of the power converters (the DC/DC converter 18, the inverter 20) match, and the common mode noise can be even more efficiently reduced.

Obviously, numerous modifications and variations of the present invention are possible in light of the above teachings. It is therefore to be understood that within the scope of the appended claims, the invention may be practiced otherwise than as specifically described herein.

What is claimed is:

1. A load driving device comprising:
a power storage device;
a first power converter including a first switching element;
a ring-shaped filter defining an opening and comprising a magnetic substance;
a first output-side power line to connect the first power converter to a first load, the first output-side power line extending through the opening so that a first output-side common mode current caused by switching the first switching element flows inside the opening through the first output-side power line in a first output-side flow direction;
a first input-side power line to connect the power storage device to the first power converter, the first input-side power line extending through the opening so that a first input-side common mode current caused by switching the first switching element flows inside the opening through the first input-side power line in a first input-side flow direction, the first input-side flow direction being same as the first output-side flow direction,
a second power converter including a second switching element;
a second output-side power line to connect the second power converter to a second load different from the first load, the second output-side power line extending through the opening so that a second output-side common mode current caused by switching the second switching element flows inside the opening through the second output-side power line in a second output-side flow direction; and
a second input-side power line to connect the power storage device to the second power converter, the second input-side power line extending through the opening so that a second input-side common mode current caused by switching the second switching element flows inside the opening through the second input-side power line in a second input-side flow direction,
wherein a first magnetic flux generated by the first output-side common mode current and a second magnetic flux generated by the first input-side common mode current flow through the ring-shaped filter.

2. The load driving device according to claim 1, wherein switching timing of the first power converter and the second power converter is controlled to be synchronized once or more in a predetermined time interval.

3. The load driving device according to claim 1, wherein the second output-side flow direction is same as the first input-side flow direction.

4. The load driving device according to claim 1, wherein the second input-side flow direction is same as the first output-side flow direction.

5. The load driving device according to claim 4, wherein the second output-side flow direction is same as the first input-side flow direction.

6. A load driving device comprising:
a power storage device;
a first power converter including a first switching element;
a ring-shaped filter defining an opening and comprising a magnetic substance;
a first output-side power line to connect the first power converter to a first load, the first output-side power line extending through the opening so that a first output-side common mode current caused by switching the first switching element flows inside the opening through the first output-side power line in a first output-side flow direction; and
a first input-side power line to connect the power storage device to the first power converter, the first input-side power line extending through the opening so that a first input-side common mode current caused by switching the first switching element flows inside the opening through the first input-side power line in a first input-side flow direction, the first input-side flow direction being same as the first output-side flow direction,
wherein the first output-side power line and the first input-side power both extend through the same opening of the ring-shaped filter, and
wherein a first magnetic flux generated by the first output-side common mode current and a second magnetic flux generated by the first input-side common mode current flow through the ring-shaped filter.

7. The load driving device according to claim 1, wherein the first magnetic flux and the second magnetic flux flow through the ring-shaped filter in a same direction.

8. A load driving device comprising:
- a power storage device;
- a first power converter including a first switching element;
- a ring-shaped filter defining an opening and comprising a magnetic substance;
- a first output-side power line to connect the first power converter to a first load, the first output-side power line extending through the opening so that a first output-side common mode current caused by switching the first switching element flows inside the opening through the first output-side power line in a first output-side flow direction; and
- a first input-side power line to connect the power storage device to the first power converter, the first input-side power line extending through the opening so that a first input-side common mode current caused by switching the first switching element flows inside the opening through the first input-side power line in a first input-side flow direction, the first input-side flow direction being same as the first output-side flow direction;
- a second power converter including a second switching element;
- a second output-side power line to connect the second power converter to a second load different from the first load, the second output-side power line extending through the opening so that a second output-side common mode current caused by switching the second switching element flows inside the opening through the second output-side power line in a second output-side flow direction; and
- a second input-side power line to connect the power storage device to the second power converter, the second input-side power line extending through the opening so that a second input-side common mode current caused by switching the second switching element flows inside the opening through the second input-side power line in a second input-side flow direction, the second output-side flow direction being same as the first output-side flow direction, wherein a first magnetic flux generated by the first output-side common mode current and a second magnetic flux generated by the first input-side common mode current flow through the ring-shaped filter.

* * * * *